(12) United States Patent
Pamulaparthy et al.

(10) Patent No.: US 9,634,490 B2
(45) Date of Patent: Apr. 25, 2017

(54) DYNAMIC VOLTAGE RESTORATION SYSTEM AND METHOD

(75) Inventors: Balakrishna Pamulaparthy, Andhra Pradesh (IN); Viswesh Goli, Andhra Pradesh (IN); Manishkumar Ramchandra Sharma, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 1266 days.

(21) Appl. No.: 13/023,487

(22) Filed: Feb. 8, 2011

(65) Prior Publication Data

US 2012/0200279 A1   Aug. 9, 2012

(51) Int. Cl.
| G05F 1/00 | (2006.01) |
| H02J 3/18 | (2006.01) |
| G05F 1/12 | (2006.01) |
| G05F 1/13 | (2006.01) |
| G05F 5/00 | (2006.01) |

(52) U.S. Cl.
CPC .............. *H02J 3/1878* (2013.01); *G05F 1/12* (2013.01); *G05F 1/13* (2013.01); *G05F 5/00* (2013.01); *H02J 3/1807* (2013.01); *Y02E 40/30* (2013.01)

(58) Field of Classification Search
CPC ................ G05F 1/12; G05F 1/13; G05F 5/00
USPC ......................................................... 307/103
See application file for complete search history.

(56) References Cited

U.S. PATENT DOCUMENTS

| 4,116,073 | A |   | 9/1978 | Mohler |
| 5,166,597 | A |   | 11/1992 | Larsen et al. |
| 5,329,222 | A |   | 7/1994 | Gyugyi et al. |
| 5,469,044 | A | * | 11/1995 | Gyugyi ................ H02J 3/1814 307/105 |
| 5,612,580 | A | * | 3/1997 | Janonis et al. ................. 307/64 |
| 5,619,119 | A | * | 4/1997 | Pelletier ................... H02J 3/06 323/212 |
| 5,808,454 | A | * | 9/1998 | Chung .......................... 323/255 |
| 6,118,676 | A |   | 9/2000 | Divan et al. |
| 6,218,744 | B1 | * | 4/2001 | Zahrte et al. ................... 307/64 |
| 6,559,562 | B1 | * | 5/2003 | Rostron ....................... 307/130 |
| 6,737,837 | B1 | * | 5/2004 | Halvarsson et al. .......... 323/205 |
| 6,750,563 | B2 | * | 6/2004 | Rostron et al. ............... 307/103 |

(Continued)

FOREIGN PATENT DOCUMENTS

| EP | 2019467 A1 | 1/2009 |
| JP | 5095631 A | 4/1993 |

(Continued)

OTHER PUBLICATIONS

Office Action issued in connection with NZ Patent Application No. 598044, Feb. 15, 2012.

(Continued)

*Primary Examiner* — Adi Amrany
(74) *Attorney, Agent, or Firm* — Parks IP Law LLC; Cynthia R. Parks

(57) ABSTRACT

A system, in one embodiment, includes a voltage fault detection system. The voltage fault detection system may be configured to acquire a reference voltage signal from a power line to determine if a voltage sag condition is present in the power line, determine a correction voltage for correcting the voltage sag condition, use the reference voltage to produce the correction voltage, and apply the correction voltage to the power line.

18 Claims, 5 Drawing Sheets

(56) References Cited

U.S. PATENT DOCUMENTS

| | | | | |
|---|---|---|---|---|
| 6,954,366 | B2* | 10/2005 | Lai et al. | 363/71 |
| 7,541,696 | B2* | 6/2009 | Dawley | 307/103 |
| 7,564,706 | B1* | 7/2009 | Herbert | 363/124 |
| 7,847,527 | B2* | 12/2010 | Berggren et al. | 323/216 |
| 7,852,050 | B2* | 12/2010 | Berggren et al. | 323/216 |
| 7,920,392 | B2* | 4/2011 | Schneider et al. | 363/37 |
| 8,436,602 | B2* | 5/2013 | Sykes | 323/301 |
| 2003/0111910 | A1* | 6/2003 | Rostron et al. | 307/130 |
| 2008/0278976 | A1* | 11/2008 | Schneider et al. | 363/37 |
| 2009/0218993 | A1 | 9/2009 | Berggren et al. | |

FOREIGN PATENT DOCUMENTS

| | | |
|---|---|---|
| JP | 2008335119 | 12/1996 |
| JP | 2011095846 | 4/1999 |
| JP | 2000066739 | 3/2000 |
| JP | 2004222476 | 8/2004 |
| WO | 96/24186 A1 | 8/1996 |
| WO | 2007/111541 A1 | 10/2007 |
| WO | 2008014945 A2 | 2/2008 |
| WO | 2008052826 A1 | 5/2008 |

OTHER PUBLICATIONS

M. Jazayeri, et al; A Novel DVR Control System Design for Compensating all Types of Voltage Sags Based on Pre-Fault Method; European Journal of Scientific Research, ISSN 1450-216X, vol. 33 No. 1 (2009), pp. 70-85.

Victor M. Moreno, et al.; Control of Dynamic Voltage Restorers Using a Fully-Configurable Digital Estimation Technique.

Jody Verboomen, et al.; Phase Shifting Transformers: Principles and Applications; Index Terms—Phase Shifting Transformer, Power Flow Control, Real Time Digital Simulator.

Dieter Dohnal; On-Load Tap-Changers for Power Transformers a Technical Digest; Mr Publication.

Ian K.P. Ross, MIEE; Voltage Sags an Explanation Causes, Effects and Correction; Voltage Sag Definition, a Voltage Sag as Defined by IEEE Standard 1159-1995, IEEE Recommended Practice for Monitoring Electric Power Quality; Omniverter Inc., Mar. 2006.

Search Report issued in connection with EP Application No. 12153361.6, Jun. 29, 2012.

English Translation of Abstract of JP2004222476.
English Translation of Abstract of JP2000066739.
English Translation of Abstract of 2008335119.
English Translation of Abstract of 2011095846.

* cited by examiner

DYNAMIC VOLTAGE RESTORATION SYSTEM AND METHOD

BACKGROUND OF THE INVENTION

The subject matter disclosed herein relates generally to power systems and, more particularly, to techniques for regulating power quality.

As consumers and industries continue to increasing rely upon electrical power systems to supply power to variety of loads, which may include various types of electronic devices ranging from consumer household electronics to industrial equipment, issues regarding power quality is also becoming an increasing concern. For example, events that affect power quality (e.g., which may manifest as faults or variations in a transmitted power signal) may include voltage sags, swells, harmonics, surges, or unbalancing, all of which may negatively affect power usage and may also cause damage to loads coupled to a power system, particularly electrically sensitive loads.

With regard to voltage sag conditions, voltage sags are typically understood to be a sudden reduction in RMS voltage, sometimes for a duration from approximately half a cycle to one minute. A number of causes may contribute to voltage sags that occur in a power transmission system, such as tripped circuit breakers, short circuit faults, electrical equipment failure (e.g., cable faults, overloading, etc.), inclement weather, and/or pollution. Additionally, voltage sags may also occur due to events at the receiving end of a power signal, such as electrical faults within an industrial facility or the startup of large induction-based devices, such as an induction motor. Unfortunately, voltage sags may contribute to the interruption and/or malfunction of voltage sensitive loads, which may include adjustable-speed drives, generators, motors (e.g., synchronous, induction, etc.) and sensitive control equipment (e.g., computers, programmable logic controllers, etc.). Further, recent studies have shown that voltage sag conditions have a generally high probability of occurring, and are one of the most frequently occurring types of power quality events. Accordingly, there exists a need to better control and regulate power quality via the detection and correction of voltage sag conditions to better protect voltage sensitive loads from interruption and/or malfunction.

BRIEF DESCRIPTION OF THE INVENTION

In one embodiment a system includes a voltage fault detection system. The voltage fault detection system may be configured to acquire a reference voltage signal from a power line to determine if a voltage sag condition is present in the power line, determine a correction voltage for correcting the voltage sag condition, use the reference voltage to produce the correction voltage, and apply the correction voltage to the power line.

In another embodiment, a power system includes a power transmission path and a control system coupled to the power transmission path. The control system may be configured to detect and correct a voltage sag condition occurring in the power transmission path and may include a data acquisition unit configured to acquire a voltage in the power transmission path as a reference voltage signal, a correction unit configured receive the reference voltage signal from the data acquisition unit, compare the reference voltage signal with a target voltage, and determine a required correction voltage based on a difference between the target voltage and the reference voltage signal, shunt transformer circuitry configured to derive the correction voltage using the reference voltage signal, and series transformer circuitry configured to apply the correction voltage to the power transmission path to correct the voltage sag condition.

In a further embodiment, a circuit is provided and includes an input for receiving a reference voltage from a power line, processing logic configured determine whether the reference voltage deviates from an expected target voltage, and correction circuitry configured to use the reference voltage to produce a correction voltage to correct for the deviation.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed further below, certain embodiments provide techniques for voltage fault detection and correction in a power system. For instance, a voltage fault detection system may be provided that is capable of detection voltage faults in a power line, such as voltage sag conditions. The fault detection system may derive a correction voltage that is applied to the power line, such that downstream loads are not affected by the voltage sag. In accordance with disclosed embodiments, the correction voltage may be derived using a shunt transformer that receives at a primary winding a reference voltage signal from the power line corresponding to the measured voltage of the power signal. A tap changer (OLTC) tied to the secondary winding of the shunt transformer may be controlled to select a tap point on the secondary winding that will cause the required correction voltage to be induced at the secondary of the shunt transformer. This correction voltage may then be applied to the power line. Thus, embodiments of the voltage fault detection system disclosed herein may be capable of generating a correction voltage necessary to correct a voltage sag condition based directly upon the reference voltage and without requiring additional separate energy storage devices.

Figure 1:
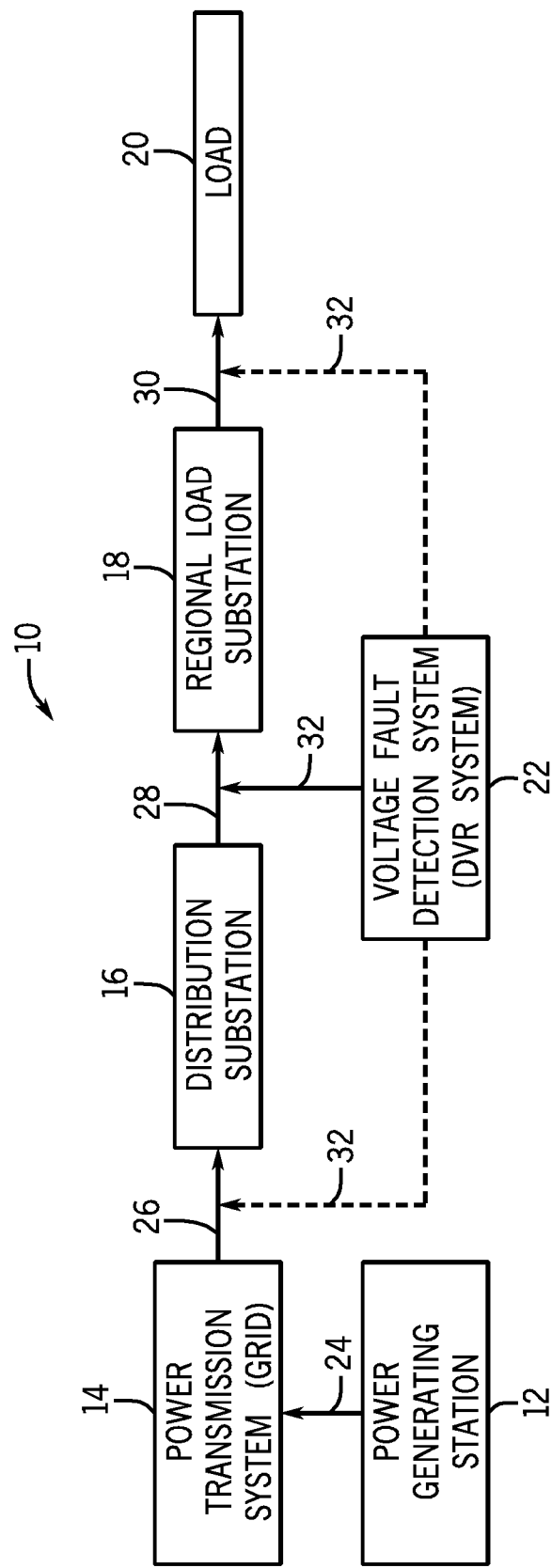
FIG. 1 is a block diagram depicting an embodiment of a power system that may include a voltage fault detection system configured for detecting and correcting voltage sag conditions.

With these points in mind, FIG. 1 depicts a simplified system diagram showing an embodiment of an electrical power system 10. The illustrated power system 10 includes a power generating station 12, a power transmission system 14, a distribution substation 16, a regional load substation 18, and a load 20. Additionally, the power system 10 includes a voltage fault detection system 22. As will be discussed further below, the voltage fault detection system 22 may be configured to detect and correct (e.g., restore) for certain voltage fault conditions, such as voltage sag. Thus, while we have referred to the system 22 as a "voltage fault detection system," it should be understood that such a system is capable of not only detecting such faults, but also correcting them (e.g. restoration).

The power generating station 12 may be a facility that is configured to generate electrical power. For instance, the power generating station 12 may be designed to generate electrical power via generating mechanical power to drive a generator which, in turn, converts the mechanical power into electrical energy. In some embodiments, mechanical power may be produced by the combustion of fuels, such as by using gas turbine systems, by way of pressurized steam, such as by using a steam turbine, or by using a combination of both fuel combustion and pressurized steam (e.g., a combined cycle turbine system). In other embodiments, electrical power be produced by the power generating station 12 using nuclear reactors, geothermal technologies, or renewable energy, which may include using bio-fuels, hydroelectricity (from water), solar power (from sunlight), or wind power, or a combination of such power-producing technologies.

Power generated by the power generating station 12 is typically alternating current (AC) power (reference number 24), which may be three-phase or single-phase AC power, and may be provided to the power transmission system 14. The power transmission system 14 may include a network of interconnected power transmission lines, circuit breakers, cables, switches, transformers, and other suitable components, that may transmit the power 24 to one or more destinations, such as the illustrated distribution substation 16. By way of example, power transmission lines of the power transmission system 14 may include overhead power lines, underwater and/or underground power cables, or a combination thereof. Such a power transmission system 14 may be referred to as a power grid. In some embodiments, particularly where power is to be transmitted over great distances, high voltage direct current (HVDC) may be utilized. For instance, AC power generated at the power generating station 12 may be converted to DC power, which is typically less susceptible to line losses, transmitted, and then converted back into AC power at a receiving substation.

As shown in FIG. 1, power 26 transmitted by the power transmission system 14 may be received by a distribution substation 16, which may distribute the power to a distribution system servicing a particular region. The distribution substation 16 may include one or more transformers configured to step down or reduce the voltage of the power 26 received from the power transmission system 14. For instance, in some embodiments, power 26 transmitted via the power transmission system 14 may be at a high voltage, i.e., a range of between approximately 11 kilovolts (kV) to approximately 765 kV, and the distribution substation 16 may step the voltage of the power 26 down to a range of between approximately 2.4 kV to approximately 33 kV, based on values that are suitable for distribution to the local region.

In the illustrated embodiment, power 28 at a reduced voltage is further transmitted from the distribution substation 16 to the regional load substation 18 (sometimes referred to as "feeders"), which may be configured to further reduce or step down the voltage of the received power 28 to a level that is suitable for distribution to consumers (e.g., residential, commercial, industrial, etc.), who may use the power (reference number 30) to power the load 20. The power 30 provided by the regional load substation 18 may supply power mains to which consumers may directly connect (e.g., through an electrical outlet or wall plug). As can be appreciated, the voltage of the power 30 supplied via the power mains may vary depending upon the local region (e.g., usually between 100 V to 240 V). For instance, in the United States, power mains typically supply power at a nominal voltage of approximately 120 V (at 60 hertz (Hz) frequency). In other regions, such as in certain parts of Europe and in India, power mains may supply power at a nominal voltage of approximately 230 V (at 50 Hz frequency). Further, in certain industrial applications, the load 20 may include large industrial motors, which may be driven by power supplied from mains at higher voltages, i.e., between approximately 2000 to 5000 V. While the present embodiment shows only a single distribution substation, regional load substation, and load for illustrative purposes, it should be appreciated that the power transmission system 14 may actually provide power to multiple distribution stations which may in turn provide power to drive multiple loads at various locations.

During ideal operating conditions, it is desirable to maintain the power system 10 in a balanced state, in which voltages and line and load impedances are balanced, thus resulting in balanced current. For instance, where the power system 10 is a three-phase power system, voltages and currents may be considered to be balanced when an instantaneous sum of three-phase voltages and currents at any point in time is equal to zero. Thus, a balanced state is desirable, as balanced voltages and currents are far less likely to harm voltage sensitive loads (e.g., adjustable-speed drives, synchronous and induction motors, computer-based control systems, programmable logic controllers, generators, etc.). However, as discussed above, certain events inevitably occur that may negatively affect power quality and usage. Such events may include voltage sags, swells, harmonics, and/or surges, all of which may drive the power system 10 into an unbalanced state. When the power system 10 is in an unbalanced state, voltage sensitive loads may interrupt, fail, or otherwise malfunction, which may result in unplanned production stoppages and necessitate equipment repair or replacement.

In particular, voltage sags may be particularly problematic, due at least in part to their generally high probability and frequency of occurrence. As discussed above, various causes may contribute to or cause voltage sag conditions in the power system 10, including the tripping of circuit breakers, short circuit faults, electrical equipment failure (e.g., cable faults, overloading, etc.), inclement weather, and/or pollution. Additionally, voltage sags may also occur due to events at the receiving end of a power signal, such as electrical faults within an industrial facility or the fast startups of large induction-based devices (e.g., induction motors or drives). To clarify the terminology that will be used in the present disclosure, a "voltage sag" or a "voltage sag condition" or the like, shall be understood to refer to a sudden reduction in RMS voltage (on any phase for three-phase power), wherein the voltage sag refers to the amount of the decrease, i.e., either a voltage value or a percentage with respect to a nominal voltage standard. For instance, the reduction in voltage may last for a duration of approximately a half-cycle to one minute. As will be appreciated, voltage sag is sometimes defined by IEEE standards as an event in which a sudden reduction in the RMS voltage is within approximately 10 to 90 percent of a given standard, such as 120 V for North America or 230 V for India. However, as discussed below, the embodiments and techniques disclosed herein may be capable of correcting any range of voltage drops or reductions, and is not limited to just events that conform to IEEE definitions. Therefore, for the purposes of the present disclosure, a voltage sag condition may refer to a sudden reduction in RMS voltage of any appreciable amount.

Sometimes, the term voltage sag and the term "voltage dip" may be used interchangeably and, further, sometimes the term voltage sag is sometime used to refer to the remaining voltage rather than the amount of the decrease. For instance, if the latter definition is adopted, a decrease of 24 V from a nominal voltage of 120 V could be referred to as a voltage sag of 80 percent (since the remaining voltage, 96 V, is 80 percent of 120 V). However, for the purposes of the present disclosure, a voltage sag will be expressed as a percentage or value that the voltage decreases with respect to a nominal voltage. Thus, for the above example, a decrease of 24 V from a 120 V nominal voltage may be referred to as a 20 percent voltage sag (since 24 V is a 20 percent decrease from 120 V).

Figure 2:
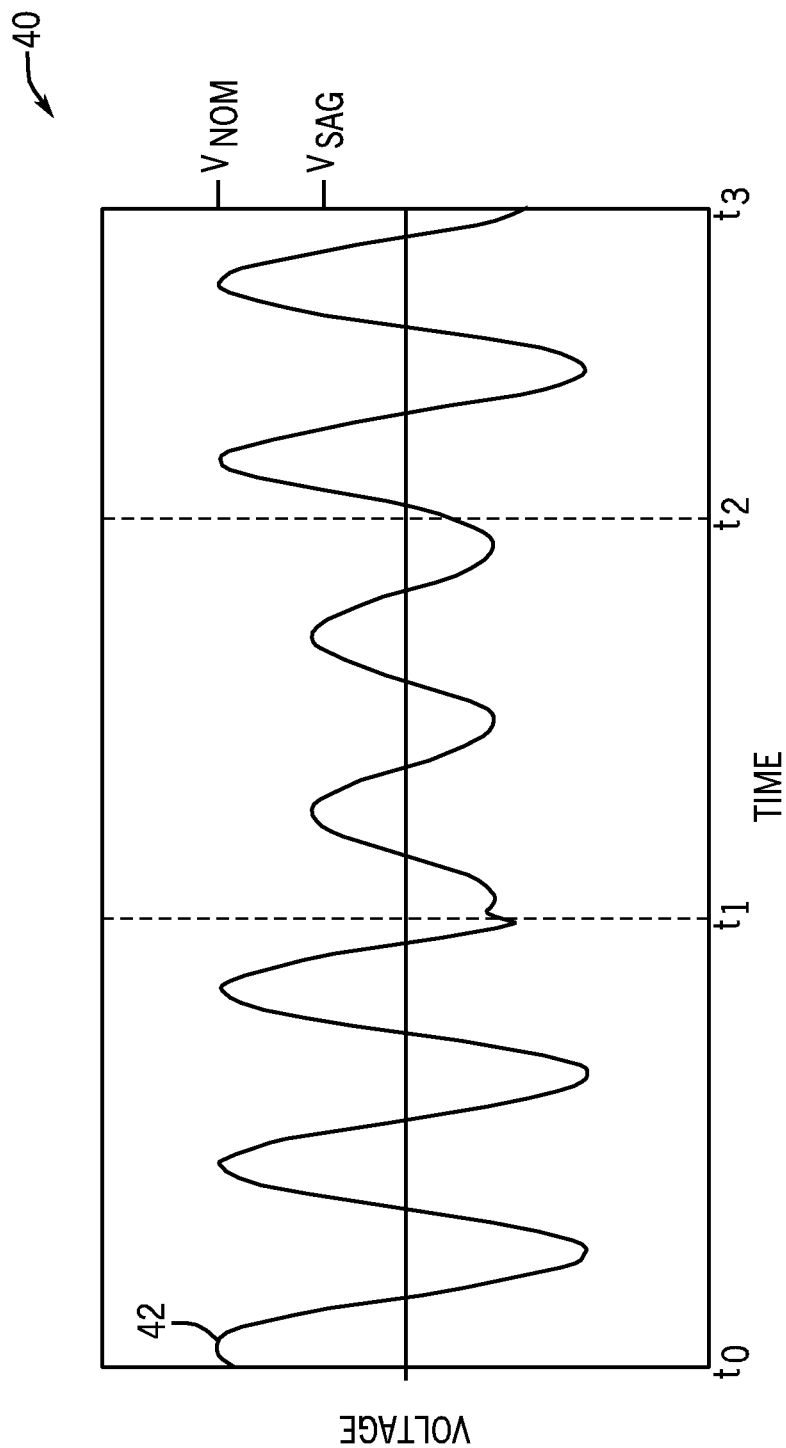
FIG. 2 is a graph depicting an example of an occurrence of a voltage sag in a conventional power system that does not include the voltage fault detection system shown in FIG. 1.

An example of a voltage sag condition that may occur in a power signal, in accordance with the present disclosure, is illustrated in the graph 40 of FIG. 2. The voltage of an AC power signal is represented by the trace line 42. From time $t_0$ to $t_1$, the power signal has a voltage that is approximately equivalent to a nominal voltage, $V_{NOM}$. A voltage sag condition occurs between times $t_1$ and $t_2$, in which a reduction in $V_{NOM}$ causes the voltage to drop to $V_{SAG}$. Then, at $t_2$, the voltage sag condition recovers, and the voltage of the power signal returns to $V_{NOM}$ between times $t_2$ and $t_3$. Further, it should be understood that voltage sag conditions may not only affect voltage amplitude, but also phase angles. Thus, this may also negatively affect (e.g., cause malfunctions) in devices and equipment that rely on supply voltage phases, such as power converters that control their firing pattern based on supply voltage phases. Thus, referring back to FIG. 1, to mitigate or otherwise reduce the effects of voltage sag conditions, the power system 10 of FIG. 1 includes the voltage fault detection system 22, which is sometimes referred as a dynamic voltage restoration (DVR) system. Further, as can be appreciated, a voltage sag may occur at any stage in the power transmission between the power transmission system 14 and the load 20, and voltage sags that occur upstream (e.g., in power 26) may affect power quality in downstream stages (e.g., power 28, 30). Thus, in general, the voltage fault detection system 22 may be configured to detect the occurrence of a fault condition, such as a voltage sag, anywhere within the power transmission path and apply an appropriate correction voltage. For instance, the voltage fault detection system 22 may be configured to apply correction voltages to detect for voltage sag conditions in the power lines through which power 26, 28, and 30 are transmitted, and apply appropriate correction voltages, referred to here by reference number 32. Further, though a single voltage fault detection system 22 is shown in the embodiment of FIG. 1, other embodiments may include separate voltage fault detection logic distributed along the various different stages of the power transmission path (e.g., the path through which power 26 is eventually provided to load 20).

Figure 3:
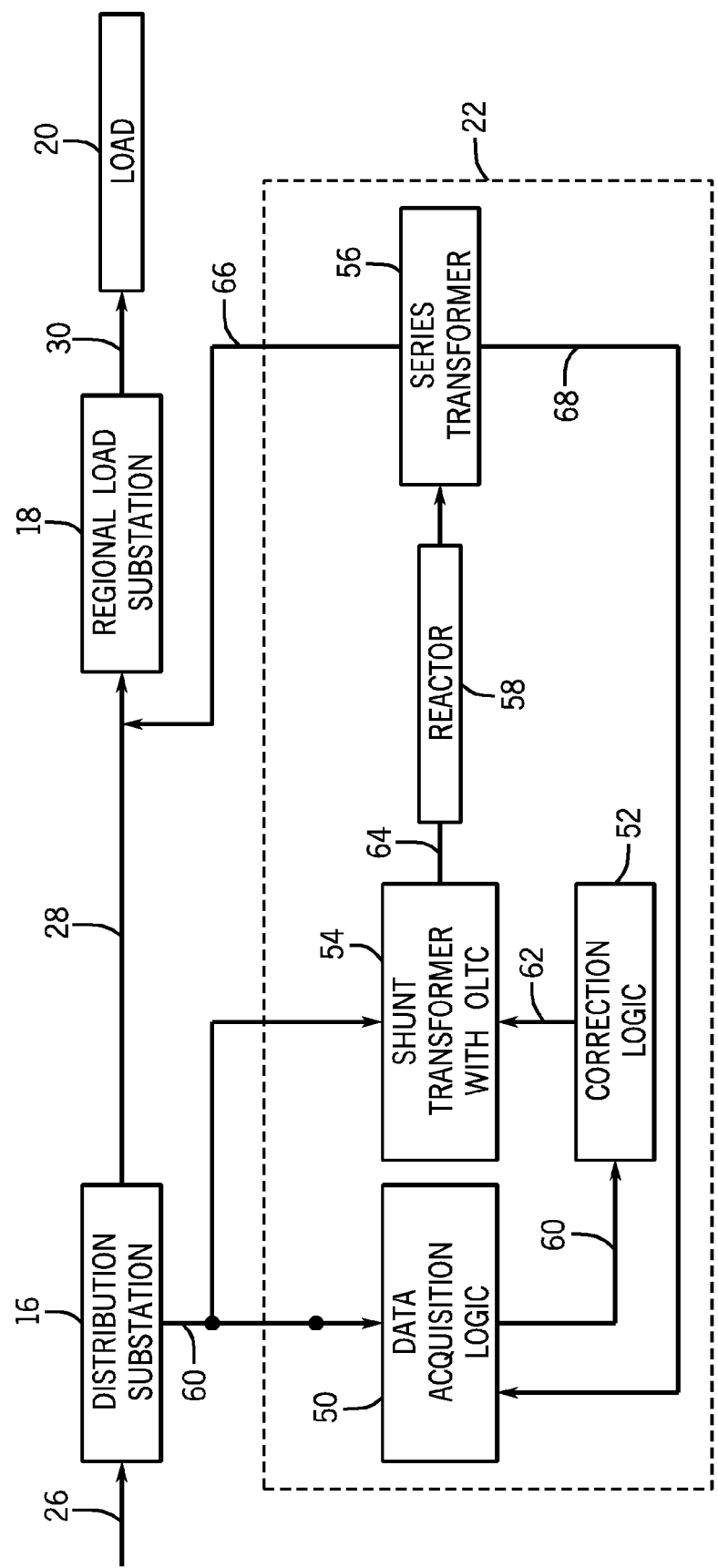
FIG. 3 is a more detailed block diagram showing components that may be present in the embodiment of the voltage fault detection circuitry of FIG. 1.

FIG. 3 illustrates an embodiment of the voltage fault detection system 22 that includes data acquisition logic 50, correction logic 52, a shunt transformer circuit 54 that includes an on-load tap changer (OLTC) device, a series transformer circuit 56, and a series reactor 58. Essentially, the voltage fault detection system 22 functions as a control system that detects a voltage sag condition, determines a deviation between the expected voltage and actual voltage, and then applies a correction voltage to the power line so that the deviation in voltage is removed, such that the voltage sag is not experienced by downstream components and loads.

As shown, the output voltage from the distribution substation 16 is provided as a reference voltage signal 60 to the data acquisition logic 50. In one embodiment, the data acquisition logic 50 may include one or more input/output (I/O) circuit board controlled by a microprocessor. For instance, in a three-phase power system, the data acquisition logic may acquire reference voltage signals 60 representative of the voltage for each of the three phases. The reference signals 60 are then forwarded to the correction logic 52, which may be configured to compare the reference signals with values that correspond to a balanced set of voltages for each phase. The correction logic 52 may be configured to implement a correction algorithm that may compare the reference voltages 60 to a set of target voltages (e.g., expected voltage values) for each phase. In one embodiment, the target voltages may be programmed or predefined, and may correspond to voltage values that are suitable for maintaining the power system 10 in a balanced state. By way of example, such target voltage values may be programmed into a nonvolatile memory (e.g., EEPROM, flash memory, etc.) or into one or more data registers on the I/O circuit board of the data acquisition logic 50. Further, while the present discussion will focus on a three-phase power embodiment, it should be understood that a single-phase power embodiment is also achievable, and would generally include one reference voltage signal 60 (instead of three reference voltage signals as is the case in the three-phase power example).

Based upon the above-mentioned comparison, the correction logic 52 determines, for each phase, whether a voltage sag condition exists. If a voltage sag condition is exists, the correction logic 52 determines the deviation between the reference voltage signals 60 and their corresponding target voltage (e.g., corresponding to the same phase of the reference voltage for multi-phase power) to derive a correction voltage(s). Based upon the derived correction voltage for the reference signal 60, control signals 62 are provided to a tap controller (also called a tap exciter) of an on-load tap changer (OLTC) coupled to secondary windings of a shunt transformer 54. The control signals 62 may indicate the deviations for each voltage in terms of amplitude and phase.

As can be appreciated, the OLTC may select a tap point that corresponds to a particular number of turns on the secondary windings of the shunt transformer 54. Additionally, the reference voltage signals 60 are provided to the primary windings of the shunt transformer circuitry 54. In a three-phase power embodiment, the series transformer circuitry 54 may include three transformers, one corresponding to each phase of the three-phase power. As will be described further below in FIG. 4, the position of the transformer secondary taps, as determined by the OLTC, affects the turns-ratio of the transformer, thus enabling control over the output voltage of the secondary windings of the shunt transformer 54. Thus, depending on the position of the secondary taps, the shunt transformer induces a voltage at each secondary winding based upon the source voltage (e.g., reference voltage 60 taken from the power line), wherein the induced voltage corresponds to correction voltage suitable for offsetting a deviation due to voltage sag, as detected by the correction logic 52. In other words, the correction voltages produced by the voltage fault detection system 22 are derived from transmitted power signals themselves, without requiring additional energy storage devices and associated auxiliary components.

The correction voltages (e.g., corrective voltage for each phase), represented here by reference number 64, are then provided to a series transformer circuit 56. Again, in a three-phase power embodiment, the series transformer circuit 56 may include three transformers. In one embodiment, each of the transformers of the series transformer circuit 56 may have a 1:1 turns-ratio, with a secondary winding coupled to respective one of the secondary windings of the shunt transformer circuitry 54, and a primary winding coupled to the power line between the distribution station 16 and the regional load substation 18. Thus, the correction voltages induced at the secondary winding outputs of the shunt transformer circuitry 54 is provided to the secondary windings of the series transformer circuitry 56, thereby inducing the correction voltage at the primary windings. The correction voltages, referred to here by reference number 66, may then be applied to the power line, such that the voltage sag condition is not seen by downstream components (e.g., load 20, substation 18).

Further, in the embodiment shown in FIG. 3, certain embodiments of the voltage fault detection system 22 may also include a series reactor circuit 58 coupled between the shunt transformer 54 and series transformer 56. The series reactor 58 may be configured to adjust the phase angles of the derived correction voltages 64 to correct for phase deviations, as indicated by the control signals 62. Additionally, the present embodiment of the voltage fault detection system 22 also includes a feedback loop 68 through which the correction voltages 66 output from the series transformer 56 is fed back to the data acquisition logic 50. Using this feedback signal 68, the detection system 22 may monitor the voltage of the power 28 concurrently with the correction voltages 66 so that voltages are not unnecessarily injected into the power lines, such as in a scenario where a drop in voltage recovers very quickly before the correction voltage may be applied (e.g., voltage sags that occur for only a duration of less than a half-cycle, which may be less than 0.02 seconds).

As will be understood, while the voltage fault detection system 22 shown in FIG. 3 is configured to detect and correct voltage sags occurring in the transmitted power 28 (e.g., between the distribution substation 16 and the regional load substation 18), the voltage fault detection system 22 may similarly be configured to detect and correct voltage sags occurring in the transmitted power 26 (e.g., between the power transmission system 14 and the distribution substation 16) and the power 30 (e.g., between the regional load substation 18 and the load 20). For instance, separate discrete voltage fault detection systems 22 may be provided at each stage of the power transmission path. Additionally, the voltage fault detection system 22 may be an integrated system that is distributed along the power transmission path and includes correction logic and circuitry configured to produce correction voltages at any stage in the event of a voltage sag.

To further illustrate the voltage sag correction techniques that may be performed by the voltage fault detection system 22, as described above in FIG. 3, the following examples are provided. In a first example, consider a power line that transmits power at a target nominal voltage of 230 V that experiences a voltage sag of 90 percent for a duration of one minute. In this example, the reference voltage signal 60 that is provided to the data acquisition logic 50 and a primary winding of the shunt transformer 54 will be approximately 23 V (reflecting a 90 percent decrease from the nominal voltage 230 V). Here, the correction logic 52 may determine that correcting a voltage sag of 90 percent will require a correction voltage that is equal to the deviation between the reference voltage (23 V) and the target voltage (230 V), or approximately 207 V. Accordingly, the correction logic 52 will provide a control signal (e.g., signal 62) to a tap exciter, which causes the OLTC to select a tap point on the secondary winding of the shunt transformer 54 that results in the secondary winding stepping up the 23 V primary voltage (provided to the primary winding) to a secondary voltage of 207 V. The secondary voltage, which serves as the correction voltage 66, may then be applied to the power line using the series transformer 56 to correct the voltage sag condition for this first example.

In a second example, consider the same power line discussed in the first example, but with a voltage sag of 30 percent for a duration of one minute. In this example, the reference voltage signal 60 that is provided to the data acquisition logic 50 and a primary winding of the shunt transformer 54 will be approximately 161 V (reflecting a 30 percent decrease from the nominal voltage 230 V). Here, the correction logic 52 may determine that correcting a voltage sag of 30 percent will require a correction voltage that is equal to the deviation between the reference voltage (161 V) and the target voltage (230 V), or approximately 69 V. Accordingly, the correction logic 52 will provide a control signal (e.g., signal 62) to a tap exciter, which causes the OLTC to select a tap point on the secondary winding of the shunt transformer 54 that results in the secondary winding stepping down the 161 V primary voltage (provided to the primary winding) to a secondary voltage of 69 V. This secondary voltage, which serves as the correction voltage 66, may then be applied to the power line using the series transformer 56 to correct the voltage sag condition for this second example.

As can be seen from the two examples provided above, the shunt transformer 54 may function as either a step-up or step-down transformer depending on the selection of the tap applied to the secondary windings. For instance, if the reference voltage 60 is less than 50 percent of the target voltage (e.g., 230 V), then the shunt transformer 54 may act as a step-up transformer, and, if the reference voltage 60 is greater than 50 percent of the target voltage, the shunt transformer 54 may act as a step-down transformer. Thus, for voltage sags that cause a reduction of less than 50 percent from a target nominal voltage, the shunt transformer 54 performs a step-down function based on the reference voltage to derive the correction voltage, and for voltage sags that cause a reduction of greater than 50 percent from a target nominal voltage, the shunt transformer 54 performs a step-up function.

Figure 4:
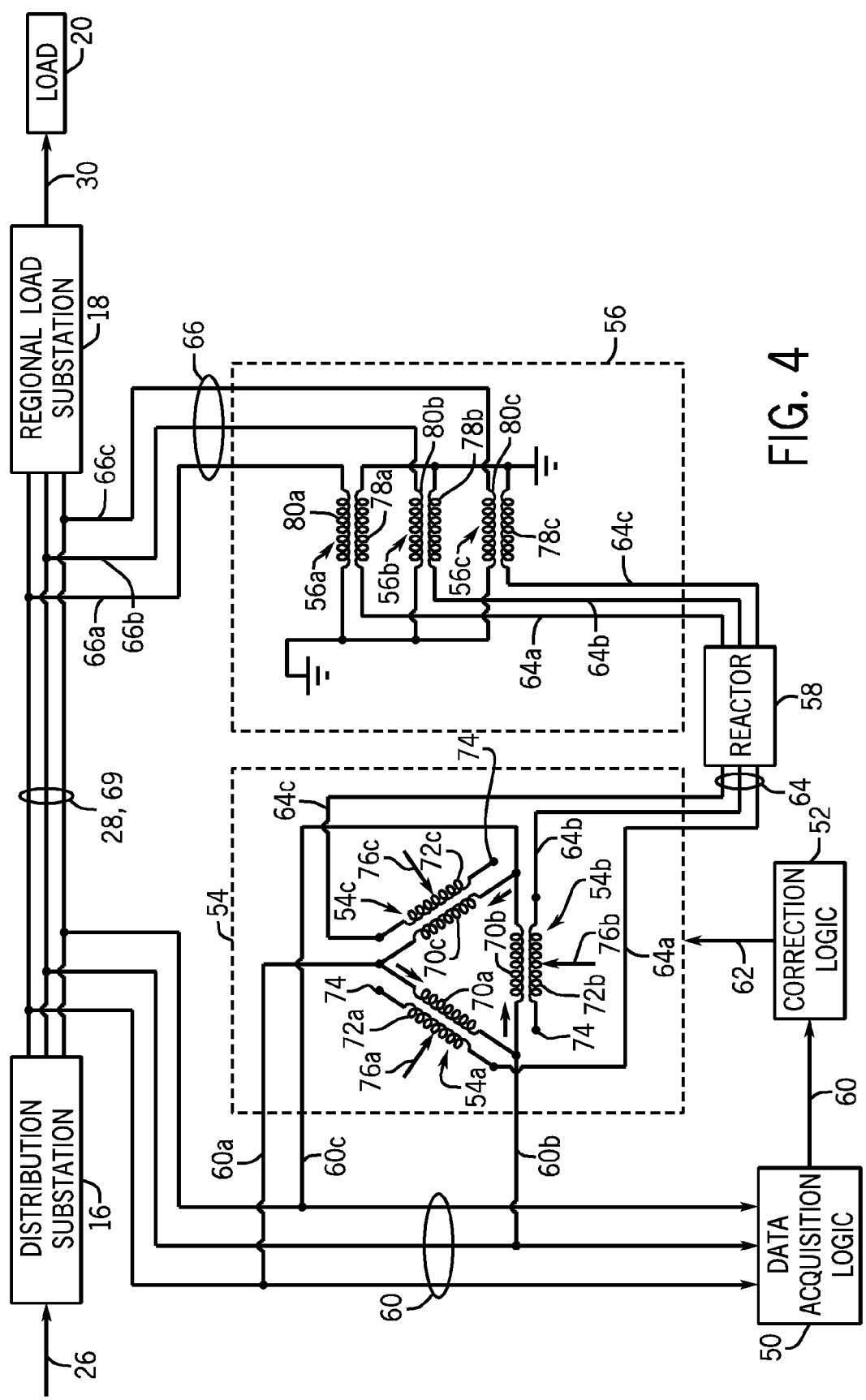
FIG. 4 is a partial circuit schematic diagram that illustrates an embodiment of shunt transformer circuitry and series transformer circuitry that may be part of the voltage fault detection system shown in FIG. 3.

Continuing to FIG. 4, a more detailed view of the voltage fault detection system 22 of FIG. 3 is shown, in which the shunt transformer circuit 54 and series transformer circuit 56 are depicted using circuit schematic symbols. As shown, the power 28 may be three-phase power transmitted from the distribution substation 16 to the regional load substation 18 using the transmission lines 69. When correcting for voltage sag conditions, reference signals 60 are provided to the data acquisition logic 50 and the shunt transformer circuitry 54 and may include a first reference signal 60a, second reference signal 60b, and third reference signal 60c, corresponding to first, second, and third phases of the three-phase power 28, respectively.

In the present embodiment, the shunt transformer circuitry 54 may include the transformers 54a-54c arranged and configured as shown in FIG. 4. Each transformer 54a-54c includes a primary winding 70a-70c and a secondary winding 72a-72b. As illustrated, the reference signal 60a is provided to primary winding 70a of the transformer 54a, the reference signal 60b is provided to primary winding 70b of the transformer 54b, and the reference signal 60c is provided to the primary winding 70c of the transformer 54c. Each secondary winding 72a-72c may include one terminal 74 coupled to ground 74. Further, each secondary winding 72a-72c may include multiple transformer taps. As discussed above, the correction logic 62 may implement a correction algorithm to determine control signals 62 that may control on-load tap changers (OLTCs), represented here by reference numbers 76a-76c, to select a tap on its respective secondary winding 72a-72c to produce correction voltages 64 at the outputs of the secondary windings 72a-72c of the shunt transformer circuitry 54. For instance, the OLTC 76a may select an appropriate tap on the secondary winding 72a of transformer 54a to produce a correction voltage 64a that may correct for voltage sag on the phase corresponding to reference signal 60a. Similarly, the OLTC 76b may select a tap on the secondary winding 72b of transformer 54b, and the OLTC 76c may select a tap on the secondary winding 72c of transformer 54c, wherein the position of the taps on the secondary windings 72b and 72c result in the output of the voltages 64b and 64c that may be used to correct for voltage sag in the phases corresponding to the reference signals 60b and 60c, respectively. In other words, the correction voltages 64a, 64b, 64c are derived using the reference signals 60a, 60b, and 60c without requiring additional separate energy storage devices. Further, as depicted in the present embodiment, the three shunt transformers 54a-54c may be implemented using a single three-phase transformer (e.g., a phase-shifting transformer).

In the illustrated embodiment, the correction algorithm implemented by the correction logic 52 may receive the reference signals 60a, 60b, and 60c and determine the phase and angle of each reference signal. Then, the correction algorithm may convert the phase and angle values to rectangular coordinates, which are than compared with target voltage values to determine a deviations (if any) between the reference voltage signals and the target voltages. The deviations may then be converted into polar coordinates, which may be used to generate the correction signals 62. Further, in one embodiment, the taps on the transformers (54a-54c) may be configured such that each tap may cause the secondary winding 72 to produce an output voltage that is a percentage of the reference voltage 60. Thus, based upon the reference voltage received at the primary winding 70 and the deviation calculated by the correction logic 52, the OTLC 76 may select an appropriate tap on the secondary winding 72, such that the output of the secondary winding is a voltage that is a percentage (e.g., can be greater than 100 percent in cases where voltage is stepped up) of the voltage at the primary winding, and equivalent to a correction voltage.

The selection of the taps on the secondary windings 72a-72c may be accomplished using the OLTCs 76a-76c in conjunction with a binary positional encoder, such as a Gray code sensor. The OLTC (76a-76c) may be provided using any suitable type of tap changer mechanism. For instance, in some embodiments, the OLTC 76 may include reactor or resistor-based tap changers, oil-based tap changers, thyristor-assisted changers, solid-state tap changers, or any combination thereof. Further, in one embodiment, the OLTC 76 may include a tap changer that utilizes vacuum switching technology. When compared to certain other types of tap changer OLTC devices, vacuum-type OLTCs may offer several advantages with regard to operability and reliability. For example, vacuum-type OLTCs typically offer faster switching times compared to other types of OLTCs, such as oil-based OLTCs, particularly in ranges of low and medium power applications, and may also have smaller form factors compared to other types of existing OLTCs. Additionally, vacuum-type OLTCs may exhibit dielectric recovery times (e.g., up to 10 kV/microsecond) that are generally faster relative to other types of OLTCs. This may provide shorter arcing times (e.g., one half-cycle), even in cases where large phase angles are present between current and voltage.

Further, because vacuum-type OLTCs are hermetically sealed systems, the arcs generated by the OLTC do not interact with a surrounding medium, and switching characteristics are not necessarily dependent on the surrounding medium. The arc voltage in the vacuum may be considerably lower than in other mediums, such as oil or sulfur hexafluoride ($SF_6$), thereby reducing energy consumption and contact wear. Moreover, the elimination of the insulating medium may also reduce or eliminate the creation of certain by-products (e.g., carbon). This provides easy and convenient disposal and does not require the use of an online filter. Since there is no aging of an insulating medium, vacuum switching technology may provide generally constant and reliable switching characteristics throughout the entire life of the vacuum interrupters. That is, the absence of medium-interaction or oxidation during switching results in improved re-condensation rates of metal vapor on the contacts of a vacuum-type OLTC, thereby extending usable contact life and lowering contact resistance. For example, some vacuum-type OLTCs may be able to perform as many as 300,000 operations or more without requiring maintenance.

Referring still to FIG. 4, the series reactor 58 may receive the outputs 64a-64c from the shunt transformer secondary windings 72a-72c, which may represent correction voltages, and adjust the phase angles of the derived correction voltages 64a-64c to correct for phase deviations, as indicated by the control signals 62. The correction voltages are then received by the series transformer circuit 56, which includes the transformers 56a-56c. Each transformer 56a-56c may include a primary winding 80a-80c and a secondary winding 78a-78c. As discussed above, the transformers 56a-56c may have a 1:1 turns-ratio. Thus, the correction voltages 64a-64c provided to the secondary windings 78a-78c will cause an equivalent voltage 66a-66c to be induced at the primary windings 80a-80c. The correction voltages 66a-66c may be applied to the power lines 69 to correct for voltage sag conditions, such that downstream loads (e.g., load 20, regional load substation 18) will see the expected nominal voltage.

Figure 5:
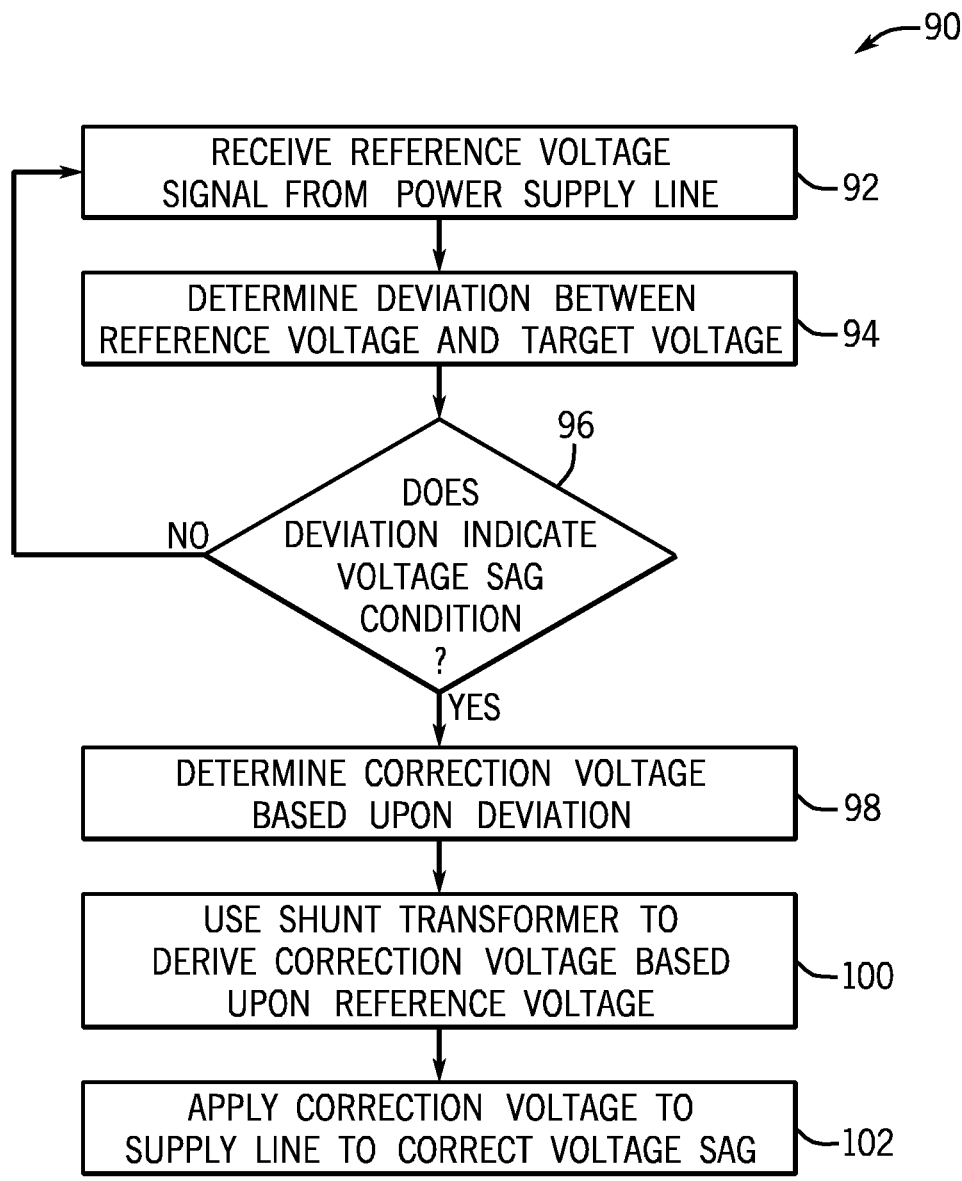
FIG. 5 is a flow chart depicting a process for detecting and correcting voltage sag conditions, in accordance with an embodiment of the present invention.

FIG. 5 is a flow chart depicting a process 90 for correcting voltage sag in a power system 10. Particularly, the process 90 may be consistent with the operation of the above-described embodiments of the voltage fault detection and correction system 22. The process 90 begins at block 92, where a reference voltage signal (e.g., 60) is acquired from a power supply line (e.g., 69). Next, at block 94, a deviation between the reference voltage and target voltage is determined. For instance, the deviation may be determined by the correction logic 52 (FIGS. 3 and 4). Thereafter, at decision logic 96, the correction logic may determine whether the deviation indicates a voltage sag condition. For instance, if a voltage sag condition is present, the deviation may indicate that the reference voltage is less than the target voltage. Similarly, if no voltage sag condition is present, the deviation may be zero (e.g., the reference voltage is equal to the target voltage).

If the decision logic 96 indicates that no voltage sag condition is present, the process 90 may return to block 92, as shown in FIG. 5. If the decision logic 96 indicates that a voltage sag condition is present (e.g., the deviation indicates a reduction in the target voltage), then the process 90 continues to block 98, wherein the required correction voltage for correcting the voltage sag is determined based upon the deviation. Subsequently, at block 100, a shunt transformer (e.g., shunt transformer 54) may be used to derive the required correction voltage using the reference voltage signal. For instance, as discussed above in FIG. 4, the correction logic 52 may provide a signal (e.g., 62) that may control an on-load tap changer to select a tap on a secondary winding of the shunt transformer. The selected tap may step up or step down the reference voltage, which may be provided to the primary winding of the shunt transformer, such that the required correction voltage is induced at the secondary winding. Then, at block 102, the correction voltage is applied to the power supply line to correct the voltage sag. For instance, in the embodiment shown in FIG. 4, the correction voltage provided by the shunt transformer may be phase adjusted by a series reactor (e.g., 58) and then supplied to a series transformer (e.g., 56) with a 1:1 turns-ratio that receives (e.g., at a secondary winding) and then outputs the correction voltage (e.g., from a primary winding) to be applied to the main supply lines.

The techniques and embodiments described above for voltage fault detection and correction may offer several advantages when compared to other types of voltage fault detection systems. For instance, some existing voltage fault detection/correction systems (e.g., dynamic voltage restoration systems) that address voltage sag issues may operate by producing a correction voltage using a separate energy storage device, such as a large bank of capacitors. To generate an appropriate corrective voltage using such an energy storage device, additional auxiliary equipment is typically required, such as booster transformers, harmonic filtering circuitry, switchgears, IGCT-based voltage source converters, DC charging devices (e.g., to charge the capacitor bank), injection controllers, control and protection systems, series injection transformers, and inverter switches. Thus, existing systems, when compared to the embodiments disclosed herein, may require several additional components and may thus be more costly to implement and maintain. As discussed above, the present technique uses the voltage from the power supply line itself to induce a required correction voltage and, therefore, does not require a separate energy storage device.

Technical effects of this disclosure include providing a voltage fault detection system 22 in a power system that is capable of detection voltage faults in a power line, such as voltage sag conditions, and immediately deriving a correction voltage that is applied to the power line, such that downstream loads are not affected by the voltage sag. The correction voltage may be derived using a shunt transformer that receives a reference voltage signal from the power line corresponding to the measured voltage of the power signal at its primary. A tap changer (OLTC) tied to the secondary of the shunt transformer may, based upon a correction signal, select a tap that will cause the required correction voltage to be induced at the secondary of the shunt transformer. This correction voltage may then be applied to the power line.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A voltage detection system, for correcting a voltage sag on a power transmission line, comprising:

data acquisition logic configured to acquire a reference voltage signal generated from a reference voltage produced from the power line;

correction logic configured to (i) determine, based on the reference voltage signal, a correction voltage, (ii) generate, based on the correction voltage, a correction voltage signal, and (iii) communicate to the power line the correction voltage signal such that the correction voltage corrects the voltage sag on the power transmission line;

a shunt transformer comprising a first shunt primary winding, a second shunt primary winding, a third shunt primary winding, a first shunt secondary winding, a second shunt secondary winding, and a third shunt secondary winding, each of the shunt primary windings being in electrical connection with the power transmission line and in electrical connection, at two locations, with remaining shunt primary windings of the first, second, and third shunt primary windings, each of the shunt primary windings receiving the reference voltage, and each of the shunt secondary windings being grounded;

a series transformer comprising a first series primary winding, a second series primary winding, a third series primary winding, a first series secondary winding, a second series secondary winding, and a third series secondary winding, wherein the first series primary winding is in electrical connection with the first shunt secondary winding and ground, the second series primary winding is in electrical connection with the second shunt secondary winding and ground, the third series primary winding is in electrical connection with the third shunt secondary winding and ground, and each of the series secondary windings is in electrical connection with the power transmission line, and each of the secondary windings communicates the correction voltage to the power transmission line; and a feedback loop between the correction logic and the data acquisition logic, the data acquisition logic being configured to prevent the voltage system from applying the correction voltage on the power line when the voltage sag has recovered.

2. The voltage system of claim 1, wherein the data acquisition logic is configured to compare the correction voltage to a current power level of the power line.

3. The voltage system of claim 1, wherein the voltage detection system comprises the correction logic configured to, in a comparison, compare the reference voltage signal to a target voltage, determine a deviation from the target voltage based upon the comparison, and determine the correction voltage based upon the deviation.

4. The voltage system of claim 3, wherein the target voltage corresponds to a nominal expected voltage of a power signal transmitted by the power line.

5. The voltage system of claim 3, further comprising an on-load tap changer selecting a tap point from a plurality of tap points on at least one of the first, second, or third shunt secondary windings in response to a control signal provided by the correction logic, wherein the tap point selected causes the first, second, or third shunt secondary winding to produce the correction voltage using the reference voltage.

6. The voltage system of claim 5, wherein the on-load tap changer comprises a vacuum-type switching on-load tap changer.

7. The voltage system of claim 3, wherein each of the secondary windings of the series transformer receives the correction voltage from the shunt transformer, and the correction voltage is induced at each of the primary windings of the series transformer and applied to the power line by the series transformer.

8. The voltage system of claim 7, wherein at least one of the first, second, or third series secondary windings and at least one of the first, second, or third series primary winding of the series transformer has a 1:1 turns-ratio.

9. A power system comprising:
a power transmission path;
a reference transmission path; and
a control system coupled to the power transmission path and configured to correct a voltage sag in the power transmission path, wherein the control system includes:
a data acquisition unit configured to acquire a voltage in the power transmission path as a reference voltage signal;
a correction unit configured to receive the reference voltage signal from the data acquisition unit, compare the reference voltage signal with a target voltage, and determine a required correction voltage based on a difference between the target voltage and the reference voltage signal;
shunt transformer circuity comprising a first shunt primary winding, a second shunt primary winding, a third shunt primary winding, a first shunt secondary winding, a second shunt secondary winding, and a third shunt secondary winding, each of the shunt primary windings being in electrical connection with the reference transmission path and in electrical connection, at two locations, with remaining shunt primary windings of the first, second, and third shunt primary windings, each of the shunt primary windings receiving the reference voltage, and each of the shunt secondary windings being grounded;

series transformer circuitry comprising a first series primary winding, a second series primary winding, a third series primary winding, a first series secondary winding, a second series secondary winding, and a third series secondary winding, wherein the first series primary winding is in electrical connection with the first shunt secondary winding and ground, the second series primary winding is in electrical connection with the second shunt secondary winding and ground, the third series primary winding is in electrical connection with the third shunt secondary winding and ground, and each of the series secondary windings is in electrical connection with the power transmission path, each of the secondary windings communicating the correction voltage to the power transmission path; and a feedback loop between the correction unit and the data acquisition unit, the data acquisition unit configured to prevent the power system from applying the correction voltage on the power transmission path when the voltage sag has recovered.

10. The power system of claim 9, wherein a first on-load tap changer selects a tap point on the secondary winding of the shunt transformer in response to a control signal provided from the correction unit.

11. The power system of claim 9, wherein the power transmission path is transmits three-phase AC power.

12. The power system of claim 11, wherein the reference voltage comprises first, second, and third reference voltages corresponding to respective first, second, and third phases of the three-phase AC power and the shunt transformer circuitry further comprising a second shunt transformer having a primary winding and a secondary winding, and a third shunt transformer having a primary winding and a secondary winding, and wherein the shunt transformer produces a first correction voltage for correcting the first phase of the three-phase AC power, the second shunt transformer produces a second correction voltage for correcting the second phase of the three-phase AC power, and the third shunt transformer produces a third correction voltage for correcting the third phase of the three-phase AC power.

13. The power system of claim 12, wherein the secondary winding of the second shunt transformer is controlled by a second on-load tap changer to produce the second correction voltage based upon the second reference voltage and the secondary winding of the third shunt transformer is controlled by a third on-load tap changer to produce the third correction voltage based upon the third reference voltage.

14. The power system of claim 12, wherein the control system comprises a series reactor provides phase adjustments for each of the first, second, and third correction voltages.

15. The power system of claim 12, wherein the first, second, and third shunt transformers correspond to first, second, and third windings of a three-phase transformer, respectively.

16. The power system of claim 9, wherein the shunt transformer circuitry performs a step-up function if the voltage sag is greater than 50 percent of the target voltage and performs a step-down function if the voltage sag is less than 50 percent of the target voltage.

17. A circuit, for correcting a voltage sag on a power transmission line, the circuit comprising:
data acquisition circuitry receiving a reference voltage from the power transmission line;

correction circuitry comprising a shunt transformer including a first shunt primary winding, a second shunt primary winding, a third shunt primary winding, a first shunt secondary winding, a second shunt secondary winding, and a third shunt secondary winding, each of the shunt primary windings being in electrical connection with the power transmission line and in electrical connection, at two locations, with remaining shunt primary windings of the first, second, and third shunt primary windings, each of the shunt secondary windings being in electrical connection with a corresponding first series primary winding, second series primary winding, and third series primary winding of a series transformer, each of the shunt secondary windings and each of the series primary windings being grounded, the correction circuitry configured to perform operations comprising:

determining a correction voltage based on the reference voltage; and controlling a first operation of the shunt transformer generating an output voltage that corresponds to the correction voltage, wherein the output voltage is provided to a second transformer applying the output voltage to the power line; and a feedback loop between the correction circuitry and the data acquisition circuitry, the data acquisition circuitry preventing the correction circuitry from applying the correction voltage on the power line when the voltage sag has recovered.

18. The circuit of claim 17, wherein the correction circuitry determines the correction voltage without using a separate energy storage device.

\* \* \* \* \*